Nov. 2, 1926.

C. METZ ET AL 1,605,600

MOLDING PRESS TO MAKE MOLDED BLOCKS

Filed April 13, 1923    3 Sheets-Sheet 1

Inventors
Charles Metz and
George Schoenbacher

Nov. 2, 1926.  
C. METZ ET AL  
1,605,600  
MOLDING PRESS TO MAKE MOLDED BLOCKS  
Filed April 13, 1923   3 Sheets-Sheet 3

Patented Nov. 2, 1926.

1,605,600

UNITED STATES PATENT OFFICE.

CHARLES METZ AND GEORGES SCHOENBACHER, OF ST. PIERRE, FRANCE.

MOLDING PRESS TO MAKE MOLDED BLOCKS.

Application filed April 13, 1923, Serial No. 631,929, and in Germany December 6, 1922.

This invention relates to improvements in molding presses, the object being to provide a molding press to make molded blocks in which the molding and pressing of the blocks is done by filling the material into a mold composed of two parts one of which is movable and in which the pressing is obtained through a repeated ramming with a hand-ramming device, and the discharging of the finished mold blocks out of the mold by raising the movable part out of the mold block and guiding it against the ramming device locked at a convenient height.

Compared with similar machines for the same purpose, our improved press has the following improvements:

1. Its manipulation is much simplified.
2. The possibility of application is greater.
3. Its efficiency is very much increased.

To obtain these results quite a few novelties and improvements of construction were necessary, comprising the machine as a whole and concerning also single parts of it, the use, working and improvements of which are described and shown in the following description and drawings.

The drawings show in—

Figure 1:
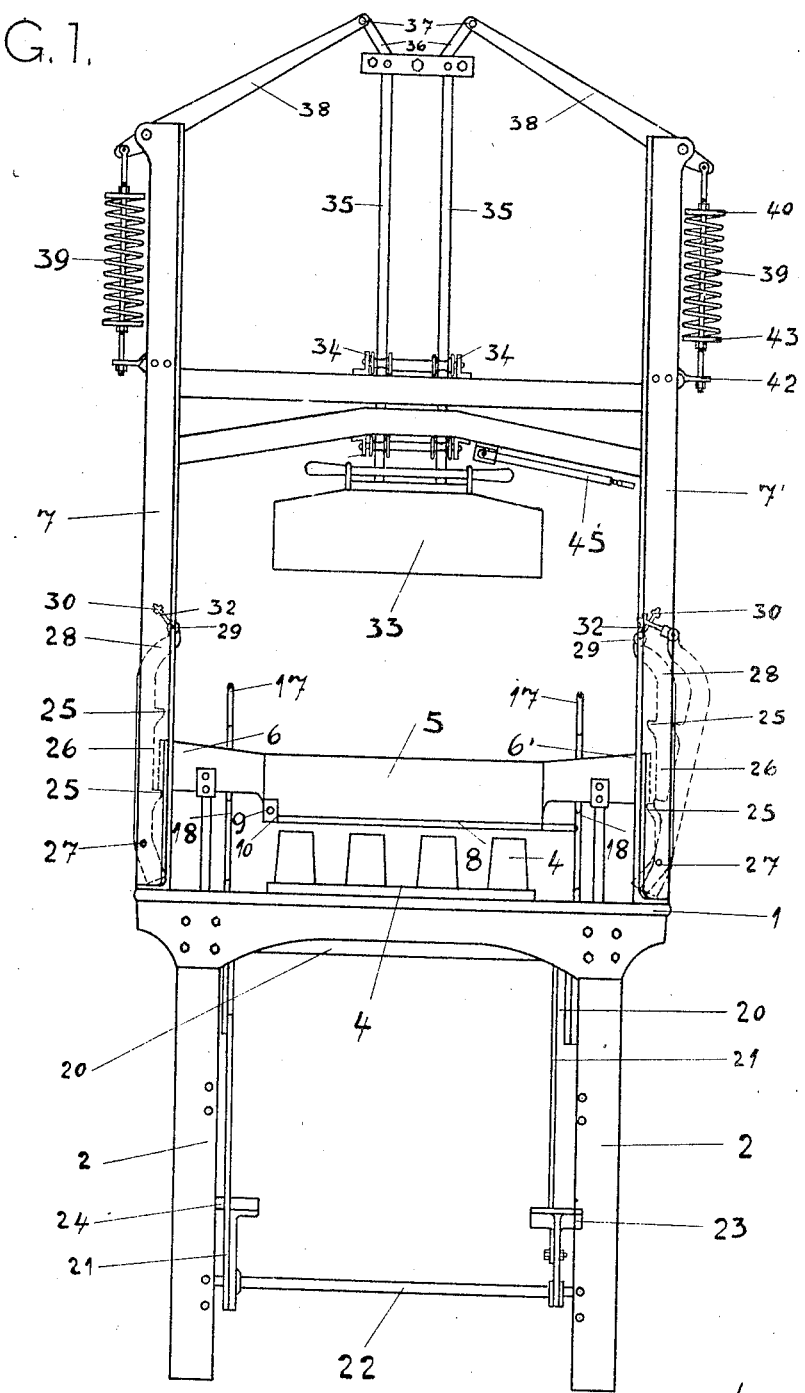
Figure 2:
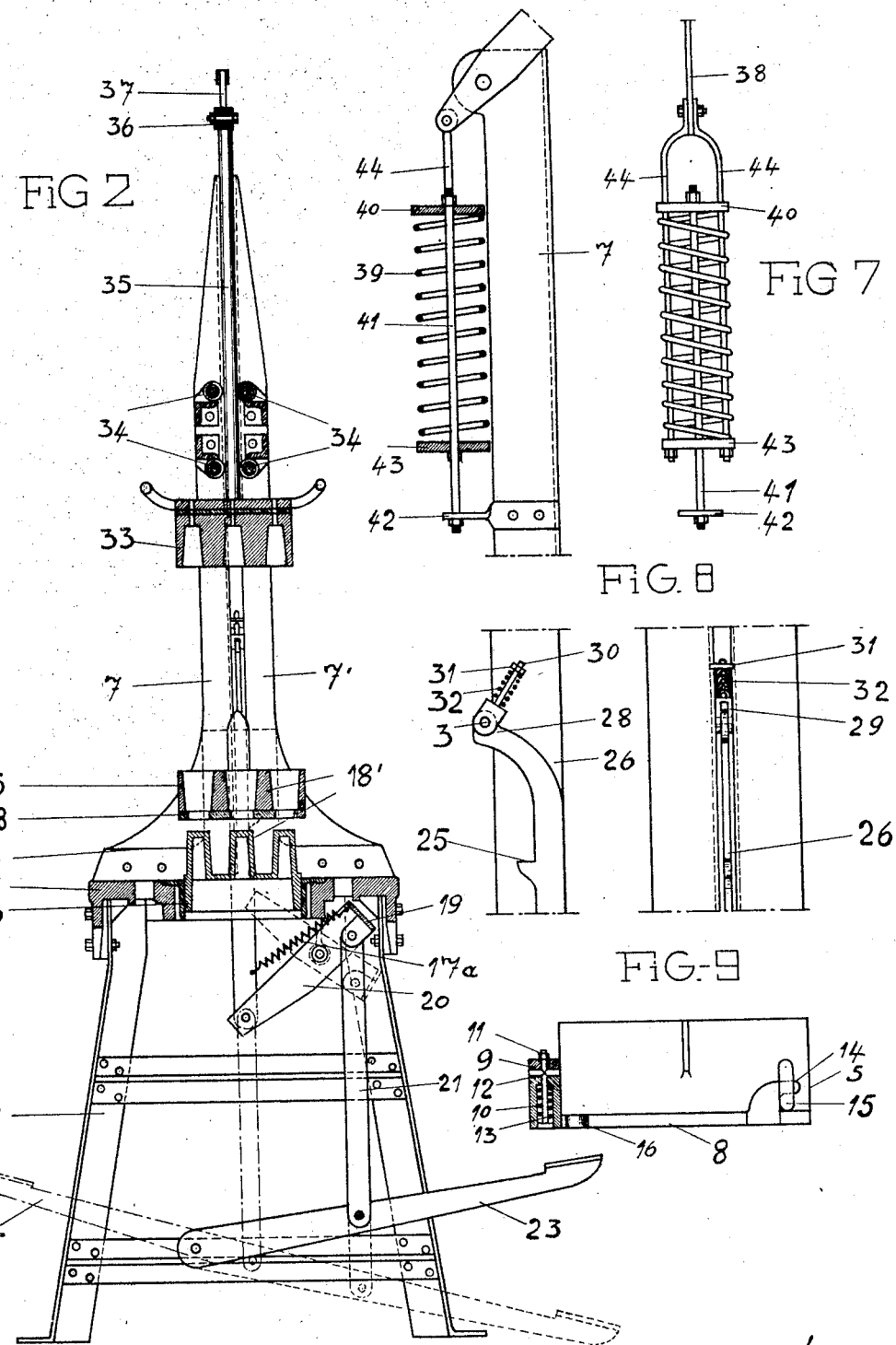
Figure 3:
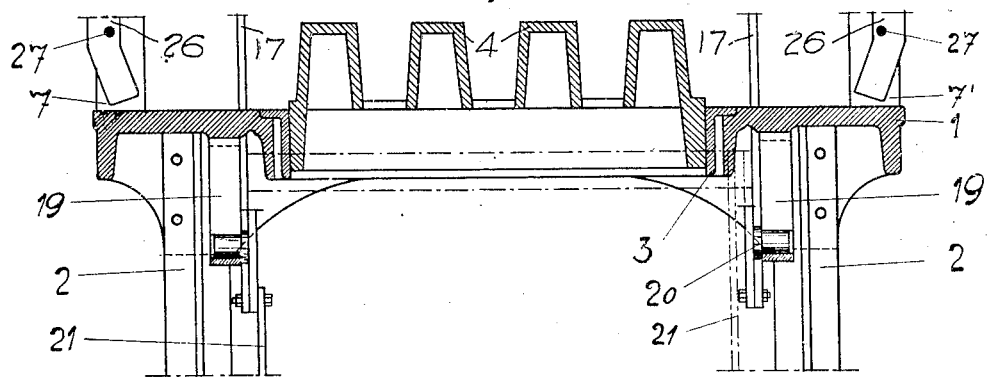
Figure 4:
Figure 5:
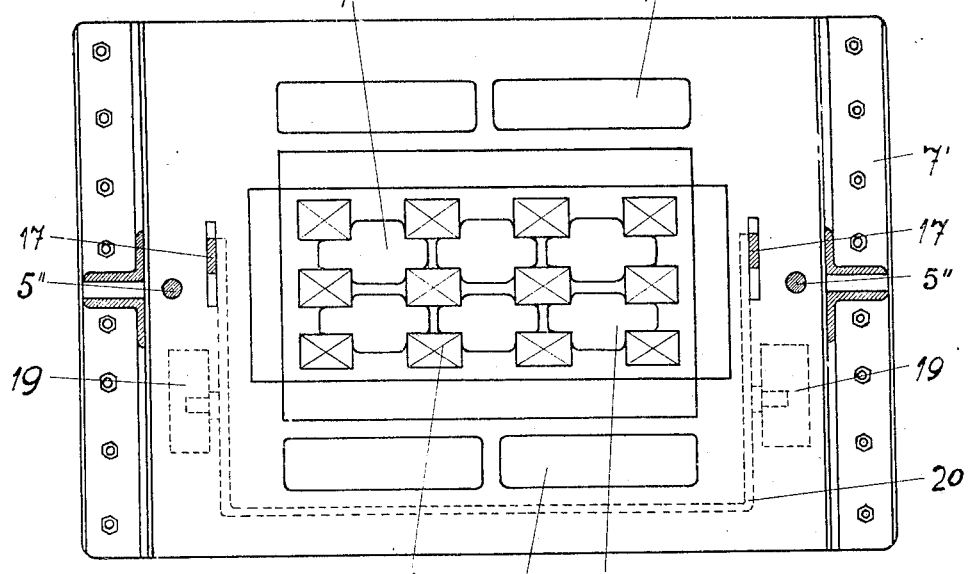
Figure 6:
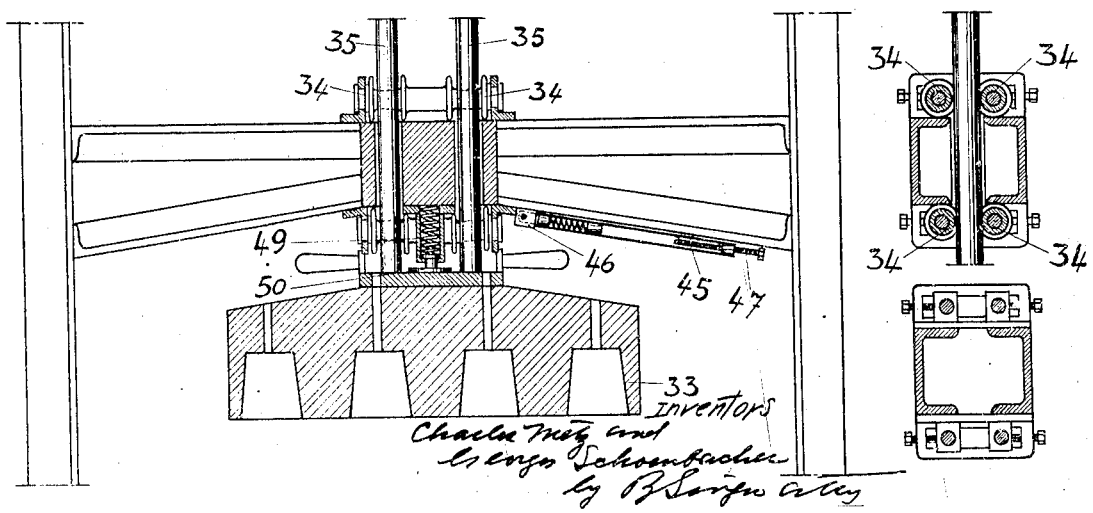

Fig. 1 a front view of the machine.
Fig. 2 a cross section.
Fig. 3 a partial section of the work table of the machine on an enlarged scale.
Fig. 4 a plan view of the portion shown in Fig. 3.
Fig. 5 a section through the ramming device and its roller-guides.
Fig. 6 a section viewed at an angle of 90° to Fig. 5.
Fig. 7 shows enlarged views at right angles to each other of one of the springs and associated parts for operating the mold plunger.
Fig. 8 shows enlarged views at right angles to each other of the upper portion of one of the releasing levers.
Fig. 9 is an enlarged view at right angles to Fig. 1 showing the mold part 5 removed and the pivot mechanism of the base plate in section.

In the drawings 1 is a work-table, 2 are the supports, 3 an opening in the table 1 for the reception of the cores of the molding box, 4' are slots between the separate cores and 4" such slots in the work-table which enable the material which is being pressed to fall therethrough when raising the mold part 5. 6, 6' are the guiding lugs on the mold part 5, these lugs being guided between pairs of vertical guides 7, 7' and in connection with which vertical guiding rods 5" disposed symmetrically to the longitudinal axis of the machine, assure a quite regular raising and lowering of the mold part 5 and also facilitate greatly the interchangeability of different molds. The mold part 5 is closed at the bottom by a horizontal base plate 8 which is hingedly connected to a lug 9. 11 is a pin rigidly secured to the lug 9 from which the base plate 8 is resiliently suspended by a spiral spring 13. A pin 12 arranged transversely to the pin 11 and formed integral therewith normally rests in a recess provided in the lug 9 and in a corresponding recess provided in a lug 10 cast integral with the base plate 8. When turning the base plate 8 the upper surface of the lug 10 bearing against the lug 9 cams over the pin 12 and thus effects a sudden separation of the base plate 8 from the mold part 5. The base plate is also provided with a hook 14 for engagement in an eye 15 provided on the mold part 5, the base plate being also provided with a handle 16. The raising of the mold part 5 is effected by means of levers 17, 17' provided with projections 18, 18' engaging with the guide lugs 6, 6', against which they are pressed by springs 17ª. The lower ends of these levers are hingedly connected at their lower ends to pedal mechanism rotatably mounted in the supports 19 and consisting of a pivotally mounted rod 20, connecting rod 21, shaft 22, pedal 23 and auxiliary pedal 24. In order to raise the mold part 5 periodically releasing levers 26 are provided which levers are rotatably mounted on shafts 27 between the vertical guides 7, 7' and are provided with projections 25. Below the shafts 27 these levers are bent slightly inwardly and are curved at their upper ends 28. To each upper end is pivoted a fork 29 of which the stem 30 slides through rotatably mounted guide plates 31. Springs 32 act upon the forks 29 in such a manner that they may be retained both in the full line and dotted line positions shown in Figure 1. The stamping mechanism of the machine preferably consists of plungers 33, guided between rollers 34, the upper surface of which is double bevelled according to the inclination of the guide cross beams and also has openings for the escaping of the enclosed air in the hollow parts of the plunger, operating rods 35, a transverse beam 36, connecting links 37, bell crank levers 38 and spiral springs 39. An essential feature of the invention consists in the arrangement of the spiral springs 39, which at their upper ends bear against a disc 40 which is secured by a central rod 41 to lugs 42, and at their lower ends against a disc 43, the said disc 43 being connected by rods 44, preferably passing along the inside of the spiral springs 39, to the short arm of the lever 38. By this means the springs 39 are retained in a vertical position and consequently operate without obstruction. The machine is completed by a setting device 45 for the plungers 33, the device 45 being adjustable in the longitudinal direction. This setting device consists essentially of a piece of pipe one end of which is connected in a spring controlled way to a holder 46 of T iron and the other end has an adjustable screw 47.

In the upraised position the device is pressed by means of a spiral spring against the side wall of the holder 46 whereas during the locking of the plunger 33 in the downward position, the setting device bears vertically against the bevelled upper surface of the plunger. In the first case the working at the table is therefore not hindered and in the second case an absolutely rigid setting of the plunger is obtained.

Between the two cross beams of the frame a spring worked buffer 49 is disposed, against which knocks a felt bolster 50 disposed on the plunger when the same is raised, hence all noise during the working is avoided.

The method of operation of the machine, for which two men are required, is substantially the same both as regards the filling of the machine and the stamping operation as in ordinary known machines of this character. The discharge of the finished molded products is also effected in the known manner by moving the mold portion 5 towards the plungers 35 which have been previously locked in position by means of the device 45. The only difference consists in the movement of the mold 5 which is effected in a more efficient manner than hitherto by first bringing the guide lugs 6, 6' of the mold part 5 into engagement with the lowermost projections 25 of the releasing levers 26 by means of the levers 17, 17', whereupon a plate is placed under the mold part 5 on the cores 4 for the reception of the molded products. By turning the handle 16 the base plate 8 will now be turned rearwardly away from the mold part 5 on the pin 11 in the manner hereinbefore described, and the molded products by the further raising of the mold part 5 and the engagement of its lugs with the second pair of projections on the releasing levers 26 are pressed out of the mold in the known manner. Any waste material from the various operations will now fall through the slots between the cores and in the work table and hence a collection of this material on the work-table will be avoided. After removal of the molded products the machine is reset for a fresh operation. For this purpose the plunger device 33 is first released, the base plate 8 is closed and the mold part 5 is raised by means of the pedal lever 23 so that the guide lugs 6 engage with the curved ends 28 of the releasing levers 26 thus pressing these laterally outwards. As soon as the vertical position of the guiding forks 29 has been passed, the releasing levers 26 are moved rigidly into the dotted position shown in Figure 1 by the action of the spring 32. The mold part 5 will now be lowered on the projections 18 and 18' of the levers 17 and 17' and after the disengagement of these levers falls back on the table. Its guide lugs 6 now pass over the inwardly inclined ends of the releasing levers 26 and thus return these to their original position. The operation above described is now repeated.

Having thus described our invention what we claim as new and desire to secure by Letters Patent is:—

1. A machine for molding plastic material comprising a frame-work, a table supported by said frame-work, mold cores carried by said table, said cores and the work-table having slots formed around them, a cooperating mold part having a bottom pivoted thereto for horizontal movement between the said cores and cooperating mold part, plungers for compressing the material in the molds, means for operating the plungers and means for raising the mold part and for controlling its downward movement.

2. A machine for molding plastic material comprising a frame-work, a table supported by said frame-work, mold cores carried by said table, said cores and the work-table having slots formed around them, a co-operating mold part, said mold part having downwardly converging inner walls, a base plate for said mold part, lugs on the mold part and on the base plate, a vertical pin passing through said lugs, said lugs having corresponding recesses in their adjacent surfaces, a cross pin secured to the vertical pin and normally engaging said recesses, a spring engaging with said vertical pin and normally tending to hold the base plate in its closed position.

3. A machine for molding plastic material comprising a frame-work, a table supported by said frame-work, mold cores carried by said table, said cores and the work-table having slots formed around them, a co-operating mold part, plungers for compressing the material in the molds, means for operating the plungers, guide lugs projecting from said mold part, vertical standards in said frame between which the guide lugs move, releasing lever for cooperating with said guide lugs, and pedal mechanism for raising and lowering said mold part.

4. A machine for molding plastic material comprising a frame-work, a table supported by said frame-work, mold cores carried by said table, said cores and the worktable having slots formed around them, a co-operating mold part, plungers for compressing the material in the molds, means for operating the plungers, guide lugs projecting from said mold part, vertical standards in said frame between which the guide lugs move, pedal mechanism for raising and lowering said mold part, releasing levers pivotally mounted between said standards, projections on said releasing levers having inwardly turned lower ends and inwardly curved upper ends, spring actuated forks engaging with the upper ends of the releasing levers, said spring actuated forks being so arranged that when the releasing levers are pressed beyond the vertical position of the spring actuated forks said releasing levers will be moved outwardly by said spring actuated forks, the inwardly bent lower ends and the inwardly curved upper ends of said releasing levers being adapted to co-operate with the guide lugs of the mold part, the said guide lugs when engaging with the inwardly curved upper ends of said levers serving to move said levers outwardly so that the projections on said levers will be moved out of the path of said guide lugs during the downward movement of the mold part, whilst when the guide lugs engage with the inwardly bent lower ends of the releasing levers the releasing levers will be returned to their normal positions.

5. A machine for molding plastic material comprising a frame-work, a table supported by said frame-work, mold cores carried by said table, said cores and the worktable having slots formed around them, a co-operating mold part, plungers for compressing the material in the molds, means for operating the plunger mechanism for locking the plungers in position whilst the molded products are being discharged from the mold, said mechanism consisting of a piece of tube connected to the frame of the machine and which can be longitudinally adjusted for the locking of the plungers during the discharging of the blocks out of the mold, a spiral spring being lodged in said tube in such a way that same bears against the side wall of the tube holder when the tube is in the upraised position and maintains it in a position not hindering the working.

6. A machine for molding plastic material comprising a frame-work, a table supported by said frame-work, mold cores carried by said table, plungers for compressing the material in the molds, means for operating the plungers and means for raising the mold part and for controlling its downward movement, and means for absorbing the recoil movement of the plungers, said means comprising a lug connected to the frame-work, a vertical rod connected at its lower end to said lug, a disc at the upper end of said vertical rod, a second disc slidably mounted on said vertical rod, a pair of rods connecting said disc to the plunger mechanism, and a coil spring arranged between said discs, the pair of rods connected to the lower disc preferably passing inside the coils of said spiral spring.

7. A machine for molding plastic material, comprising a frame work, a table supported thereby and having mold cores carried thereon, plungers for compressing material in the molds, a cooperating mold part between the cores and the plungers, means for guiding the cooperating part, and releasing levers cooperating with said guiding means.

CHARLES METZ.
GEORGES SCHOENBACHER.